(12) United States Patent
Lee et al.

(10) Patent No.: US 7,139,670 B2
(45) Date of Patent: Nov. 21, 2006

(54) IMAGE SCANNING SYSTEM AND METHOD FOR CALIBRATING SIZES OF SCANNED IMAGES

(75) Inventors: Cheng-Lung Lee, Taipei (TW); Yu-Ju Tung, Taipei Hsien (TW); Mei-Tai Chou, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/904,131

(22) Filed: Oct. 26, 2004

(65) Prior Publication Data
US 2005/0094213 A1 May 5, 2005

(30) Foreign Application Priority Data
Oct. 27, 2003 (TW) .............................. 92129822 A (51) Int. Cl.
*G01D 18/00* (2006.01)
(52) U.S. Cl. ..................................................... 702/85
(58) Field of Classification Search .................. 702/85, 702/86, 97; 358/504, 505
See application file for complete search history.

(56) References Cited

U.S. PATENT DOCUMENTS

| 6,317,219 | B1 * | 11/2001 | Kim ............................ 358/1.2 |
| 2003/0011898 | A1 * | 1/2003 | Mai et al. ................... 359/808 |
| 2003/0035155 | A1 * | 2/2003 | Chen .......................... 358/504 |
| 2004/0145787 | A1 * | 7/2004 | Lin ............................. 358/504 |
| 2004/0212856 | A1 * | 10/2004 | Zhang ........................ 358/504 |

FOREIGN PATENT DOCUMENTS

| CN | 1240971 A | | 1/2000 |
| DE | 10 2004 052 038 | * | 6/2005 |
| JP | 11-168603 | * | 6/1999 |

* cited by examiner

*Primary Examiner*—Michael Nghiem
(74) *Attorney, Agent, or Firm*—Winston Hsu (57) ABSTRACT

A system and method for calibrating sizes of scanned images automatically. The method includes scanning a reference chart, generating a calibration parameter according to the number of scanned pixels obtained in the scanning and the expected number of pixels of the reference chart, and adjusting the sizes of scanned documents according to the calibration parameter.

18 Claims, 7 Drawing Sheets

IMAGE SCANNING SYSTEM AND METHOD FOR CALIBRATING SIZES OF SCANNED IMAGES

BACKGROUND OF INVENTION

1. Field of the Invention

The present invention relates to an image scanning system and a related method, and more particularly, to an image scanning system and a related method for calibrating sizes of scanned images.

2. Description of the Prior Art

Devices with a scan module, such as a multi-function printer (MFP), a facsimile (fax) machine, a photocopier, a printer or a scanner, usually utilize optical sensors or contact sensors to scan documents. For a device utilizing optical sensors, there is an optical module including a tube, a reflecting mirror, a lens and a charged coupled device (CCD). With precise calculation and design, light illuminated from the tube to the image will reflect to the reflecting mirror and then be reflected by the reflecting mirror to pass through the lens, to be received and sensed by the CCD to generate data of the image. It is obvious that the accuracy of the image and the preciseness of the device are closely linked.

Usually, there are several different resolutions provided by a scanning device. The higher the selected resolution is, the more pixels present in the original. Therefore the quantities of scanned pixels of the same image under different resolutions are different. Besides, limited by the characteristics of the sensors and the structure of the scan module, some image processing such as shading correction and Gamma correction of the scanned data is necessary for reducing the distortion of the image data.

For producing a copy identical to the original by a printer or a photocopier, it is very important to scan the image correctly. At present, calibrations of scan modules are performed during the process of manufacturing. The correctness of scanning is limited by the device and is determined when leaving the factory. However, due to inevitable errors in the process, transport conditions, and deviation of mechanisms caused by the improper use, the accuracy of the device changes after it leaves the factory and the sizes of the scanned image and the original one differ from each other. In this way, the image printed by the printer or the photocopier is distorted, and there is inaccuracy in the further data processing. For example, when a scanner scans an image under 600 dpi resolution, if the length of the image in the horizontal direction is 1 inch, the scanner should generate 600 pixels in the horizontal direction. However, when there is distortion, the scanner is not able to generate 600 pixels correctly. If the image is enlarged in the scanning, the scanner will read more than 600 pixels, such as 625 pixels. Without proper calibration, there will be an error in further data processing, printing, or image copying. For example, if the scanned image is printed out under 600 dpi resolution, the length of the image in the horizontal direction becomes $$1 \times \frac{625}{600}$$

inches, which is different from the size of the original image.

There have been many approaches to try to solve distortions formed in the manufacturing process, that is, to solve distortions formed before the product leaves the factory. However, inaccuracy as a result of transportation conditions, and deviation of the scanner mechanism caused by the improper usage is not yet correctable.

SUMMARY OF INVENTION

It is therefore a primary objective of the claimed invention to provide an image scanning system and a related method for scanning a predetermined reference chart for calibrating sizes of scanned images.

Briefly described, the claimed invention discloses a calibrating method comprising scanning a reference chart, generating a calibration parameter according to a number of scanned pixels of the reference chart and an expected number of pixels of the reference chart, and calibrating a size of a scanned image according to the calibration parameter.

The claimed invention further discloses an image scanning system comprising a housing comprising a document platform, a scan module for scanning an image placed on the document platform, at least a reference chart located at a side of the housing that faces the scan module and close to an edge of the document platform, and a logic unit for generating a calibration parameter according to a number of scanned pixels of the reference chart and an expected number of pixels of the reference chart.

It is an advantage of the present invention that the image scanning system scans a reference chart to generate a calibration parameter according to a number of scanned pixels of the reference chart and an expected number of pixels of the reference chart. In the present invention, the distortions formed after the device leaves the factory are calibrated against.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
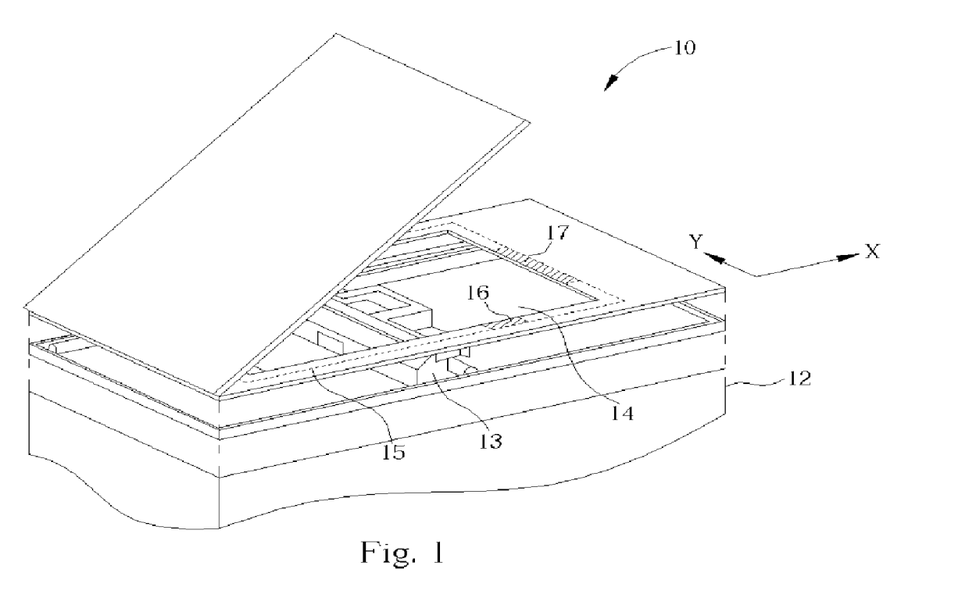
FIG. 1 is a diagram of a present invention image scanning system.

Please refer to FIG. 1. FIG. 1 is a diagram of a present invention image scanning system 10. FIG. 1 illustrates a housing 12 of the image scanning system 10, a document platform 14, and a scan module 13 for scanning an image placed on the document platform 14. FIG. 1 also illustrates an effective scanning area 15 of the document platform 14. The range of the effective scanning area 15 is broader than that of the visible side of document platform 14. Two reference charts 16, 17 are located at a side of the housing 12 that faces the scan module 13 and are close to different edges of the document platform, wherein the vertical direction is marked as Y, and the horizontal direction is marked as X. Reference charts 16 and 17 can be effectively scanned by the scan module 13. However, reference charts 16 and 17 cannot be seen outside the housing 12 and have no effect upon the scan of a document located on the document platform 14. Reference charts 16 and 17 are predetermined images. The number of pixels in the horizontal and the vertical directions under a certain resolution are given and stored in a memory of the image scanning system 10. When the scan module 13 scans the reference chart 16 and generates a number of scanned pixels in the horizontal and vertical directions, a logic unit (ref. 60 of FIG. 6) in the image scanning system 10 compares the number of scanned pixels and the given number of pixels stored in the memory in order to generate a calibration parameter, and calibrates sizes of documents scanned hereafter according to the calibration parameter.

Figure 2:
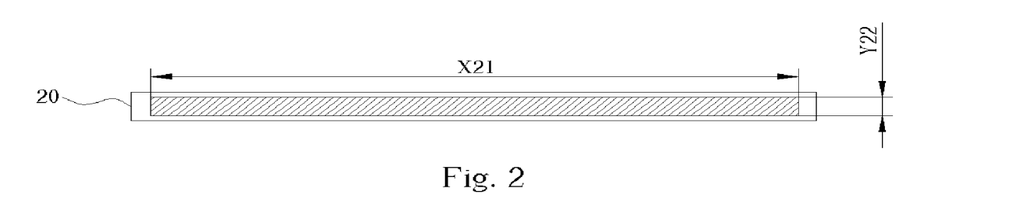
FIG. 2 is a diagram of a first embodiment of a present invention reference chart.

Please refer to FIG. 2. FIG. 2 is a diagram of a first embodiment of a present invention reference chart. The reference chart 20 is a black or dark rectangle with a white or light-colored background as illustrated in FIG. 2. The length of the long side of the rectangle is X21, and the length of the other side of the rectangle is Y22. Assuming the image scanning system 10 performs scanning calibration when the resolution is set as 600 dpi, the number of scanned pixels of X21 is 6100, and the number of scanned pixels of Y22 is 310. However, the expected number of pixels of X21 stored in the memory of the image scanning system 10 is 6000, and the expected number of pixels of Y22 is 300. This means that the image was enlarged in the scanning. In the present invention calibration method, the logic unit compares the number of scanned pixels and the expected number of pixels stored in the memory to generate calibration parameters. Following the present invention method, the horizontal calibration parameter is $$\frac{6000}{6100},$$

and the vertical calibration parameter is $$\frac{300}{310}.$$

Figure 6:
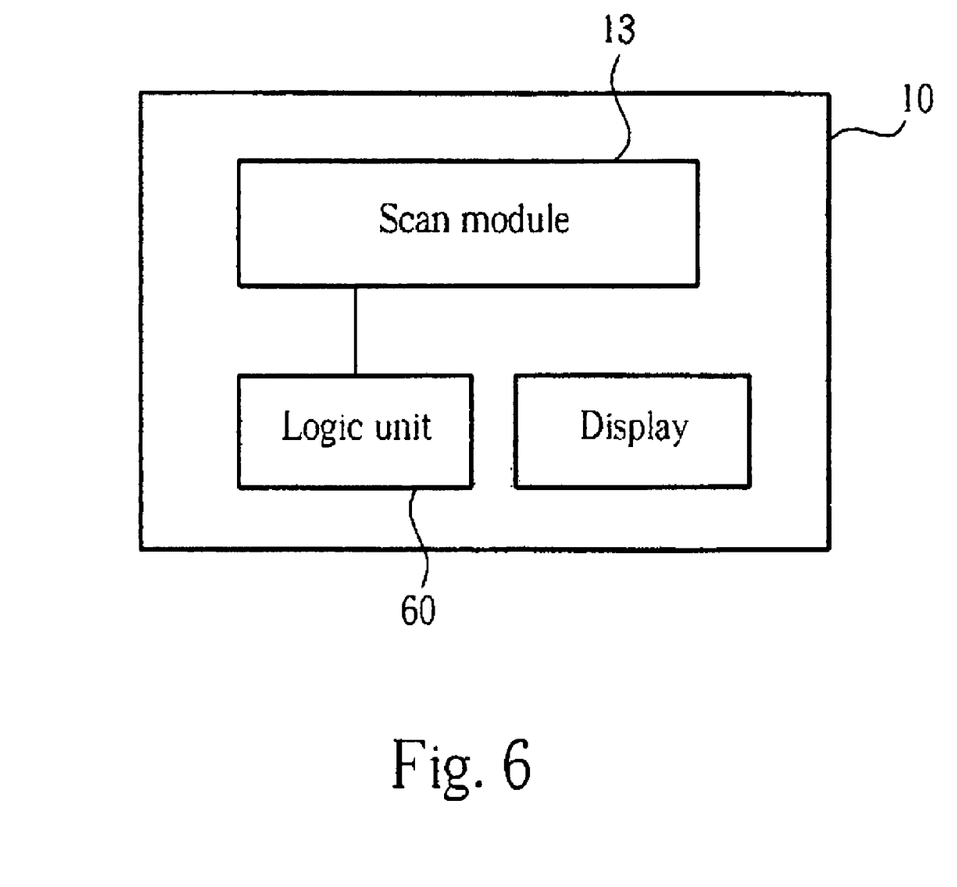
FIG. 6 is a schematic diagram of the present invention image scanning system with a logic unit.
Figure 7:
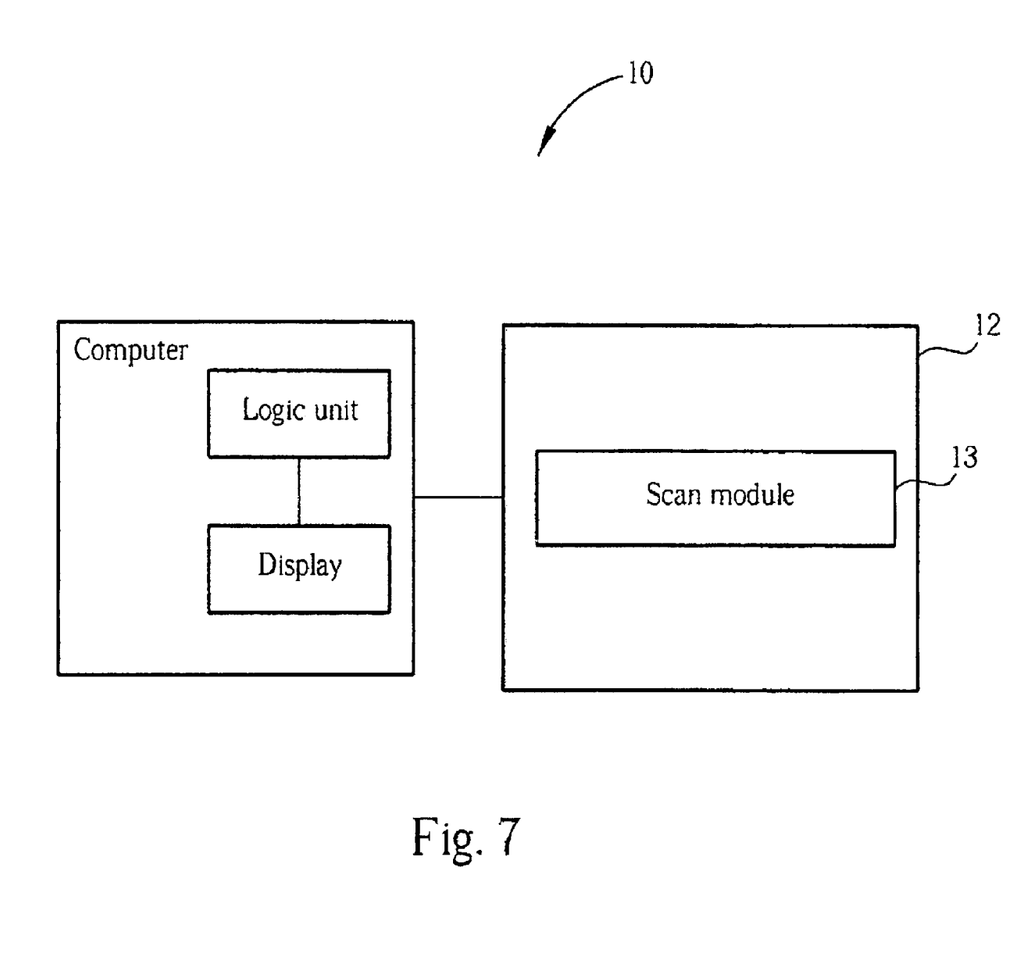
FIG. 7 is a schematic diagram of the present invention image scanning system with a computer.

After the calibration parameters are generated, when the image scanning system 10 scans an image under 600 dpi resolution and generates 65000 pixels in the horizontal direction and 3500 pixels in the vertical direction, the image scanning system 10 prints $$\frac{6000}{6100} \times \frac{65000}{600}$$

inches in the horizontal direction and $$\frac{300}{310} \times \frac{3500}{600}$$

inches in the vertical direction according to the calibration parameters. After the calibration, the printed image is identical to the original image. In the above example, the image scanning system 10 may be a multi-function printer comprising a memory and a logic unit 60 within it, as shown in FIG. 6, and possessing both a scan module and a print module, or the image scanning system 10 may be a system comprising a scanner and a computer as well, as shown in FIG. 7.

Figure 3:
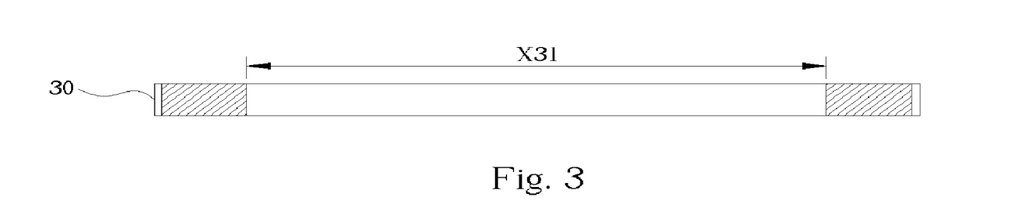
FIG. 3 is a diagram of a second embodiment of a present invention reference chart.

Please refer to FIG. 3. FIG. 3 is a diagram of a second embodiment of a present invention reference chart. The reference chart 30 is a set of two black or dark rectangles separated by a predetermined distance X31 of white or light-colored background as illustrated in FIG. 3. Assuming that the image scanning system 10 is a system comprising a scanner and a computer and performs scanning calibration when the resolution is set as 300 dpi, the number of scanned pixels of X31 is 2900. However, the expected number of pixels of X31 stored in the memory of the image scanning system 10 is 3000. This means that the image is shrunk in scanning. In the present invention scanning system, the logic unit compares the number of scanned pixels and the expected number of pixels stored in the memory to generate a horizontal calibration parameter $$\frac{3000}{2900}.$$

After the calibration parameter is generated, when the image scanning system 10 scans an image under 300 dpi resolution and gets 68000 pixels in the horizontal direction, the image scanning system 10 calibrates the image according to the horizontal calibration parameter and stores the length in the horizontal direction as $$\frac{3000}{2900} \times \frac{68000}{300}$$

inches. When the image scanning system 10 needs to print the image, it can print out the calibrated data by a printing device.

Figure 4:
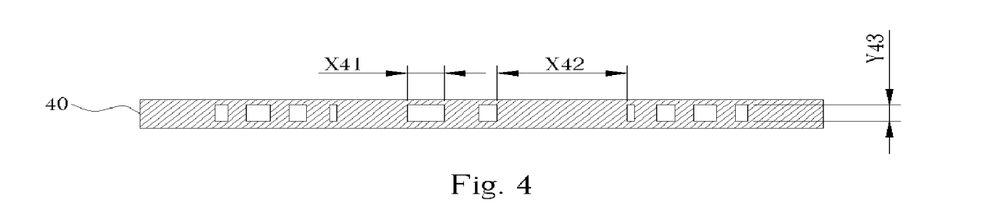
FIG. 4 is a diagram of a third embodiment of a present invention reference chart.

Please refer to FIG. 4. FIG. 4 is a diagram of a third embodiment of a present invention reference chart. The reference chart 40 is a black or dark rectangle with a predetermined white or light-colored image on it. As illustrated in FIG. 4, in the reference chart 40, there are two reference length X41 and X42 in the horizontal direction, and a reference length Y43 in the vertical direction. When utilizing the reference chart 40 for performing the claimed calibrating method, the steps described above can be followed to generate the horizontal calibration parameter and the vertical calibration parameter. Furthermore, the horizontal calibration parameter can be chosen from the two calibration parameters generated by comparisons of the scanned pixels of X41 and X42 and the expected number of pixels of X41 and X42 respectively, or by using both the parameters for verification.

Figure 5:
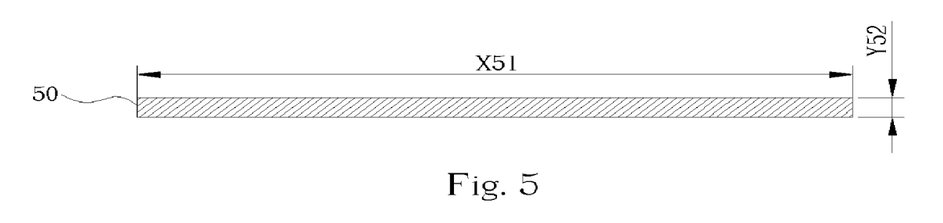
FIG. 5 is a diagram of a fourth embodiment of a present invention reference chart.

The logic unit in the present invention can be designed to generate an x-axis calibration parameter and a y-axis calibration parameter according to numbers of scanned pixels of the reference chart and the expected numbers of pixels in the x-axis direction and the y-axis direction respectively. The image scanning system is capable of adjusting sizes of images according to the calibration parameters. Please refer to FIG. 5. FIG. 5 is a diagram of a fourth embodiment of a present invention reference chart. The length of the reference chart 50 is X51 in the x-axis direction and Y52 in the y-axis direction. When the image scanning system 10 utilizes the reference chart 50 for calibration, it can generate an x-axis calibration parameter and a y-axis calibration parameter according to the numbers of scanned pixels and the expected numbers of pixels in x-axis direction and y-axis direction of reference chart 50 respectively. The image scanning system is able to adjust sizes of the image in the x-axis direction and the y-axis direction according to the x-axis calibration parameter and the y-axis calibration parameter. The image scanning system 10 may also comprise a display, as illustrated in FIG. 6 and FIG. 7, capable of displaying the scanned image, an x-axis proportional scale, and a y-axis proportional scale for illustrating the size of the image in both the x-axis and the y-axis directions.

The present invention image scanning system may be a multi-function printer (MFP), a facsimile machine, a photocopier, a printer, a scanner, or a computer combined with at least one of the above-mentioned devices. FIG. 6 illustrates an example of a stand-alone device. FIG. 7 shows a device that is required to be connected to a computer. The calibrating method may be automatically performed when the power of the image scanning system is turned on, or may be manually controlled by the user. The present invention compares the number of scanned pixels of the reference chart and the expected number of pixels of the reference chart in order to generate a calibration parameter. The calibration parameter is utilized to calibrate sizes of the following scanned images in both the horizontal and the vertical directions so that the distortion of the scanned images can be reduced. The reference chart is located at an edge of an effective scanning area of the document platform so that the reference chart can be sensed correctly but will not hinder normal scanning. There are variations in the pattern of the reference chart as long as an explicit identification of length is provided in the pattern. Embodiments of reference charts are illustrated in FIG. 2, FIG. 3 and FIG. 4. Also the identification of length may be provided in the reference chart itself but not in the pattern of it, such as the reference chart illustrated in FIG. 5. The expected number of pixels of the reference chart may be stored in the memory of the multi-function printer, the facsimile machine, the photocopier, the printer or the scanner, or may stored in a memory of a computer. The task of comparing the number of scanned pixels and the expected number of pixels to generate calibration parameters may be fulfilled by the logic unit of the MFP, the facsimile machine, the photocopier, the printer or the scanner, or by the logic unit of the computer.

In contrast to the prior art, the calibrating method of the present invention can be performed after delivery from the factory, hence the scanning of images and the processing of the scanned images are more accurate.

The skilled in the art will readily observe that numerous modification and alterations of the device may be made while retaining the teachings of the invention. Accordingly, the above disclosure should be construed as limited only by the metes and bounds of the appended claims.

What is claimed is:

1. A method for calibrating sizes of scanned images, the method comprising:
    (a) scanning a reference chart;
    (b) generating a horizontal calibration parameter and a vertical calibration parameter according to a scanned number of pixels of the reference chart in a horizontal direction and in a vertical direction and an expected number of pixels in the horizontal direction and in the vertical direction of the reference chart respectively; and
    (c) calibrating a size of a scanned image according to the calibration parameters.

2. The method of claim 1, wherein the step (c) of calibrating the size of the scanned image comprises enlarging or reducing the size of the image.

3. The method of claim 1, wherein the method is performed by an image scanning device and further comprises automatically performing the steps (a), (b), and (c) when the power of the image scanning device is turned on.

4. An image scanning system comprising:
    a housing comprising a document platform;
    a scan module for scanning an image placed on the document platform;
    at least a reference chart located at a side of the housing that faces the scan module and close to an edge of the document platform; and
    a logic unit for generating a calibration parameter according to a number of scanned pixels of the reference chart and an expected number of pixels of the reference chart, said logic unit calibrates a size of a scanned image according to the calibration parameter.

5. The system of claim 4, wherein the reference chart is located at an edge of an effective scanning area of the document platform.

6. The system of claim 4, wherein the reference chart comprises a black or dark rectangle with a white or light-colored background.

7. The system of claim 4, wherein the reference chart comprises a set of two black or dark rectangles separated by a predetermined distance of white or light-colored background.

8. The system of claim 4, wherein the reference chart comprises a black or dark rectangle with a predetermined white or light-colored image thereon.

9. The system of claim 4, which comprises a plurality of reference charts.

10. An image scanning system comprising:
    a housing comprising a document platform;
    a scan module for scanning an image placed on the document platform;
    at least a reference chart located at a side of the housing that faces the scan module and close to an edge of the document platform, wherein the length of the reference chart in an x-axis direction is L1; and
    a logic unit for generating an x-axis calibration parameter for calibrating sizes of scanned images in the x-axis direction according to a number of scanned pixels in the x-axis direction of the reference chart and an expected number of pixels in the x-axis direction of the reference chart.

11. The system of claim 10, wherein the length of the reference chart in a y-axis direction is L2, the y-axis being perpendicular to the x-axis, and the logic unit is capable of generating a y-axis calibration parameter for calibrating sizes of scanned images in the y-axis direction according to a number of scanned pixels in the y-axis direction of the reference chart and an expected number of pixels in the y-axis direction of the reference chart.

12. The system of claim 10 further comprising a display capable of displaying the scanned image and an x-axis proportional scale for illustrating the size of the image in the x-axis direction.

13. The system of claim 10 further comprising a display capable of displaying the scanned image and a y-axis proportional scale for illustrating the size of the image in the y-axis direction.

14. The system of claim 10, wherein the reference chart is located at an edge of an effective scanning area of the document platform.

15. The system of claim 10, wherein the reference chart comprises a black or dark rectangle with a white or light-colored background.

16. The system of claim 10, wherein the reference chart comprises a set of two black or dark rectangles separated by a predetermined distance of white or light-colored background.

17. The system of claim 10, wherein the reference chart comprises a black or dark rectangle with a white or light-colored image thereon.

18. The system of claim 10, which comprises a plurality of reference charts.

* * * * *